3,052,709
BENZYL PHOSPHORIC ACID ESTER COMPOUNDS
AND PROCESS FOR MAKING SAME
Richard E. Strube, Robert D. Birkenmeyer, and Fred Kagan, Kalamazoo, Mich., assignors to The Upjohn Company, Kalamazoo, Mich., a corporation of Delaware
No Drawing. Filed July 30, 1959, Ser. No. 830,468
19 Claims. (Cl. 260—461)

This invention pertains to new organic compounds, to novel intermediates therefor, and to a process for preparing the same. The invention more particularly pertains to N,N-bis-(2-haloethyl)aminomethylbenzylphosphonates which, in the free dibasic acid form, can be represented by the following general structural formula:

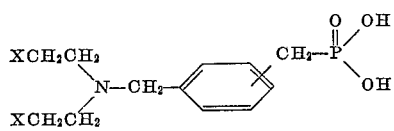

wherein X is halogen having an atomic weight between 35 and 127, e.g., chlorine, bromine, and iodine. The invention comprehends ortho-, meta-, and para-orientation of the substituents on the benzene ring.

The new organic compounds of this invention include not only the free dibasic acids represented in the foregoing formula, but also di-lower-alkyl esters (neutral esters) and mono-lower-alkyl esters (acid esters) of said acids. Advantageously, the lower-alkyl radicals of said neutral and acid esters contain from 1 to 4 carbon atoms, inclusive, for example, methyl, ethyl, propyl, isopropyl, butyl, and the like. The new compounds also include acid addition salts of said dibasic acids, acid esters, and neutral esters with pharmacologically acceptable acids, illustratively, hydrochloric, hydrobromic, sulfuric, nitric, phosphoric, tartaric, maleic, succinic, salicylic, acetic, citric, and like pharmacologically acceptable acids. The new compounds also include acid and neutral salts of the dibasic acids, as well as salts of the acid esters; the salts being preferably those with pharmacologically acceptable bases, illustratively, sodium, potassium, lithium, calcium, strontium, magnesium, aluminum, ammonium, substituted ammonium, e.g., methylammonium, diethylammonium, trimethylammonium, diethanolammonium, pentamethyleneammonium, and like pharmacologically acceptable bases.

It should be understood that the invention contemplates the replacement of the acidic hydrogens with like or unlike substituents. Hence, one can prepare, for example, an alkali metal salt of a mono ester, or the individual alkyl radicals of a diester can be different.

The N,N-bis-(2-haloethyl)aminomethylbenzylphosphonates of this invention are related to nitrogen mustards, and, in general, possess the chemical reactivities characteristic of the bis-(2-chloroethyl)amino group. Nitrogen mustards, bis- and tris-(2-chloroethyl)-amines and their sulfide analogues, are well-known for their unusual reactivity with living cells. In low concentrations, simple nitrogen mustards inhibit the anabolic and mitotic activities of proliferating cells; they also induce chromosomal aberrations and gene mutations. At higher concentrations, cellular disfunctions occur which are unlike those produced by other types of chemical agents. The effects are strikingly similar to cellular damage caused by biologically excessive dosages of X-radiation.

The novel compounds of this invention are active against neoplastic growths in birds and mammals, and they can be used in the treatment and control of various diseases. For example, they are useful against diseases comprising "the avian leukosis complex." This group of neoplastic diseases of poultry, particularly chickens, causes widespread and serious economic losses. The losses due to the form known as lymphomatosis have been estimated to be of the order of 59,000,000 chickens in one year. Other forms of the "avian leukosis complex" include, for example, true leukemias, granuloblastosis, and myelocytomatosis.

Although the compounds of the invention are known to be active against avian and mammalian tumors, e.g., leukemias, and other diseases of the reticuloendothelial system; the efficacy of the compounds in the treatment of neoplastic growths in humans has not yet been established.

The mutagenic character of the compounds of this invention provides controllable means for inducing mutations in microorganisms. Since the rate of gene mutation is accelerated and therefore, the chance of an improved strain occurs more frequently than under natural conditions, the selective process is enhanced. This property is especially valuable in the development of mutant strains of antibiotic-producing or acid-producing organisms such as Streptomyces, Penicillium, and Aspergilli, where more productive strains are continually being sought.

The new compounds of this invention possess surprising activity against viruses. Illustratively, diethyl p-[N,N-bis-(2-chloroethyl)aminomethyl]benzylphosphonate possesses marked contact activity against type 2 polio virus and vaccinia virus. The compounds can be used in disinfection, and for decontamination of areas and materials, and can readily be applied as the active ingredient in solutions, emulsions, and suspensions for spraying, washing, painting, immersing, etc., and in dusts, aerosols, fumigants, etc., according to methods and procedures well known in the pesticide and disinfectant arts.

The inherent alkylating properties of the compounds of the invention make them useful as textile chemicals, as adhesives, and for the treatment of leather. They can be polymerized to yield new plastics.

The novel compounds of the invention are prepared by condensing an ortho-, meta-, or para-cyanobenzyl halide with a trialkyl phosphite to produce a novel dialkyl o-, m-, or p-cyanobenzylphosphonate; the cyano group is then reduced to the aminomethyl group; and the thus-obtained dialkyl aminomethylbenzylphosphonate is reacted with a 2-hydroxyethylating agent to produce a dialkyl N,N-bis-(2-hydroxyethyl)aminomethylbenzylphosphonate. The dialkyl N,N-bis-(2-haloethyl)aminomethylbenzylphosphonates of this invention are then obtained by replacing the hydroxyl groups of the dialkyl N,N-bis-(2-hydroxyethyl)-aminomethylbenzylphosphonates with halogen by reaction with a halogenating agent according to methods well known in the art.

The ortho-, meta-, and para-cyanobenzyl halides which are the starting compounds of the process of the invention are known. The chlorides and bromides can be prepared according to the method of Case, J. Am. Chem. Soc. 47, 1143–1147 (1925). The iodides can be prepared metathetically, e.g., by reacting a chloride or bromide with sodium or potassium iodide in the presence of an inert solvent such as acetone or methyl ethyl ketone.

The novel dialkyl cyanobenzylphosphonate intermediates of the invention are obtained by reacting a cyanobenzyl halide with a trialkyl phosphite. For this reaction, the cyanobenzyl halide is mixed with the trialkyl phosphite (e.g., trimethyl phosphite, triethyl phosphite, tripropyl phosphite, triisopropyl phosphite, and tributyl phosphite) and the reaction is carried out at a temperature of from about 75° to 150° C. or even higher, such as at the reflux temperature of the trialkyl phosphite, for a period of from about 2 to 10 hours, depending upon the particular reaction temperature and/or reactants being employed. At times the reaction may begin rather violently, in which case the temperature of the reaction mixture should be reduced, e.g., by means of an ice bath, until the reaction subsides, whereupon heating can be resumed. After the reaction is completed the reaction mixture can be worked up in any convenient manner, e.g., by fractional distillation under reduced pressure, in order to strip off any remaining reactant material and/or alkyl halide formed during the reaction, and continuing the distillation if it is desired to obtain the dialkyl cyanobenzylphosphonate in purified form.

Reduction of a dialkyl cyanobenzylphosphonate to a dialkyl aminomethylbenzylphosphonate can be accomplished by the usual methods of chemical reduction, catalytic hydrogenation, electrolytic reduction, or by other reduction methods commonly known in the art. Chemical reduction can be carried out, for example, using sodium and alcohol. Ordinarily, however, reduction is preferably accomplished by means of catalytic hydrogenation using a noble metal catalyst, e.g., platinum oxide, palladium-on-charcoal, and the like, or base metal catalyst, e.g., Raney nickel. Advantageously, catalytic hydrogenation is accomplished with hydrogen under pressure in the presence of a noble metal catalyst, e.g., such as those mentioned. Preferably, this hydrogenation is carried out in a medium acidified with acids such as hydrochloric (preferred), sulfuric, acetic, and the like. Illustratively, the dialkyl cyanobenzylphosphonate is dissolved in an alcohol, e.g., methanol, ethanol, propanol, and the like; the solution is acidified with hydrochloric acid; catalyst is added; and hydrogen under pressure is introduced. The resulting dialkyl aminomethylbenzylphosphonate is recovered in conventional manner, such as by evaporating the solvent, basifying the residue, and extracting with an inert solvent, e.g., benzene, toluene, and the like.

The dialkyl aminomethylbenzylphosphonate intermediate can be N-alkylated with a 2-hydroxyethylating agent such as ethylene oxide or an ethylene halohydrin such as ethylene chlorohydrin or bromohydrin to produce dialkyl N,N-bis-(2-hydroxyethyl)aminomethylbenzylphosphonate.

Advantageously, alkylation with ethylene oxide can be accomplished by sealing a mixture of the dialkyl aminomethylbenzylphosphonate dissolved in an inert solvent, for example, benzene and the like, and ethylene oxide in a glass liner enclosed in a steel bomb and heating to about 50° to 100° C. for about 4 to 10 hours. Higher or lower temperatures and shorter or longer times, respectively, can be used but ordinarily it will not be necessary or desirable to use temperatures below about 10° C. or above about 150° C. After the reaction is completed, the solvent and excess ethylene oxide are distilled and the crude product is purified by solvent extraction, fractional crystallization, chromatographic separation, or other purification procedures.

The resulting dialkyl N,N-bis-(2-hydroxyethyl)aminomethylbenzylphosphonates are readily hydrolyzed with acids to give the free dibasic acids or with alkali to give the acid esters.

The compounds of the invention can now be prepared by halogenating the monoalkyl or dialkyl N,N-bis-(2-hydroxyethyl) - aminomethylbenzylphosphonates or the free dibasic acids. The chloro (or bromo) compounds can be prepared by direct halogenation using a mixture of chloroform, pyridine hydrochloride (or hydrobromide), dry pyridine, and thionyl chloride (or bromide). The direct halogenation carried out with the free dibasic acids or the acid esters should be followed by hydrolysis to hydrolyze any acid halide that may be formed.

The N,N - bis - (2 - iodoethyl)aminomethylbenzylphosphonates of the invention are prepared by a metathetic reaction of a bis-(2-chloroethyl) or bis-(2-bromoethyl) compound with an alkali metal iodide such as sodium, potassium, or lithium iodide in the presence of an inert solvent such as acetone or methyl ethyl ketone.

The free dibasic acids or acid esters can be converted into monoesters, diesters, including mixed esters, ester salts, acid salts, and neutral salts by the usual procedures of esterification and neutralization known in the art.

The acid addition salts of the neutral esters, acid esters, and dibasic acids of the invention are obtained by reacting said neutral esters, acid esters, and free acids with pharmacologically acceptable acids, illustratively, hydrochloric, hydrobromic, sulfuric, nitric, phosphoric, tartaric, maleic, succinic, salicylic, acetic, citric, and like pharmacologically acceptable acids.

The following examples are illustrative of the process and products of the present invention, but are not to be construed as limiting.

PREPARATION 1

*Preparation of p-Cyanobenzyl Bromide*

Five hundred g. of p-toluonitrile was heated to 180° C. and irradiated with an ultraviolet lamp (100 watt, 3660 A., adjacent to reaction vessel) while 750 g. of bromine was introduced into the reaction mixture as rapidly as decolorization took place. When the reaction mixture was cooled, solidification occurred. The solid was washed with water and recrystallized twice from ethanol, yielding 390° g. of p-cyanobenzyl bromide having a melting point of 115° to 116° C.

EXAMPLE 1

*Preparation of Diethyl p-[N,N-Bis-(2-Chloroethyl) Aminomethyl]Benzylphosphonate*

*Part A.—Preparation of diethyl p-cyanobenzylphosphonate.*—A mixture consisting of 370 g. (1.89 moles) of p-cyanobenzyl bromide and 400 g. (2.40 moles) of triethyl phosphite in a three liter, round-bottomed flask equipped with a stirrer, a thermometer, and a short reflux condenser (operating as an air condenser) was heated in an oil bath at 95° to 100° C. for one hour. A reaction occured with formation of ethyl bromide which was allowed to escape, and was exhausted through the hood. After the reaction had been allowed to proceed for one hour, the temperature of the oil bath was increased to 130° C. during 30 minutes, and this temperature was maintained for one hour. The temperature of the oil bath was then increased to 150° C., and while the reaction mixture was held at this temperature for one hour, water was allowed to flow through the condenser. The reaction mixture was then cooled to room temperature and distilled under reduced pressure. The excess triethyl phosphite was removed at 15 to 20 mm. mercury pressure, and the desired diethyl p-cyanobenzylphosphonate distilled at 0.03 mm. mercury pressure and a temperature of 146° to 150° C.; weight, 456 g. (96% yield). The compound is hygroscopic.

Following the foregoing procedure but substituting p-cyanobenzyl chloride and p-cyanobenzyl iodide, respectively, for p-cyanobenzyl bromide, diethyl p-cyanobenzylphosphonate is prepared.

*Part B.—Preparation of diethyl p-aminomethylbenzylphosphonate.*—A mixture consisting of 63.3 g. (0.25 mole) of diethyl p-cyanobenzylphosphonate and 400 ml. of absolute ethanol containing 30 g. (0.83 mole) of dissolved hydrogen chloride was hydrogenated at room temperature under 50 p.s.i. hydrogen pressure, using platinum oxide catalyst. The reaction mixture was filtered and the ethanol was removed under reduced pressure at room temperature. An oil that remained was cooled with ice, and sodium hydroxide solution (prepared by dissolving 20 g. of sodium hydroxide in 100 ml. of water) was added slowly with stirring. The mixture was extracted with five 200 ml. portions of benzene. The benzene extracts were combined and most of the solvent was distilled at atmospheric pressure. The last traces of benzene were removed under 0.03 mm. mercury pressure. The light-brown residual oil contained a very small amount of crystalline material which was removed by filtration. The oily diethyl p-aminomethylbenzylphosphonate thus obtained weighed 51 g. (79% yield). A small portion was subjected to distillation under reduced pressure, the remainder being retained for reaction purposes without further purification as in Part C below. Distillation of the small portion afforded purified diethyl p-aminomethylbenzylphosphonate having a boiling point of 130° to 139° C. at 0.05 mm. mercury pressure. During distillation the liquid in the flask suddenly solidified, whereupon distillation was discontinued. Analyses obtained on the distillate were as follows:

*Analysis.*—Calculated for $C_{12}H_{20}NO_3P$: N, 5.45; P, 11.65. Found: N, 5.30; P, 11.79.

*Part C.*—*Preparation of diethyl p-[N,N-bis-(2-hydroxyethyl)aminomethyl]benzylphosphonate.*—A mixture consisting of 10.3 g. (0.04 mole) of diethyl p-aminomethylbenzylphosphonate prepared in Part B, 25 ml. of ethylene oxide, and 20 ml. of benzene was sealed in a glass liner enclosed in a steel bomb and heated at 75° C. for 6 hours. After cooling to 25° C. the liner was opened and the solvent and excess ethylene oxide were evaporated, leaving 13.8 g. of crude product. This crude product was dissolved in 10 ml. of methylene chloride and adsorbed on a Florisil (a synthetic magnesia-silica gel) column (1" by 16"). The column was eluted with petroleum ether-acetone (9:1, by volume), and diethyl p-[N,N-bis - (2 - hydroxyethyl)aminomethyl]benzylphosphonate was recovered in fractions 10 through 18. After evaporation of the solvent, the combined fractions yielded 7.4 g. (53.5% yield) of diethyl p-[N,N-bis-(2-hydroxyethyl)aminomethyl]benzylphosphonate having a refractixe index $[n_D^{25}]$ of 1.5123.

*Analysis.*—Calculated for $C_{16}H_{28}NO_5P$: C, 55.64; H, 8.17; N, 4.06; P, 8.97. Found: C, 5626; H, 8.64; N, 3.89; P, 8.40

*Part D.*—*Preparation of diethyl p-[N,N-bis-(2-chloroethyl)aminomethyl]benzylphosphonate.*—A mixture consisting of 500 ml. of chloroform, 15 g. of pyridine hydrochloride, 10 ml. of dry pyridine, 41 ml. of thionyl chloride in a two-liter flask was adjusted to a temperature of 25° C. with an ice bath. Then, 200 ml. of chloroform containing 5.7 g. (0.0164 mole) of diethyl p-[N,N-bis(2-hydroxyethyl)aminomethyl]benzylphosphonate was introduced dropwise with stirring over a two-hour interval. The temperature of the reaction mixture rose from 25° C. to 32° C. during this interval. The chloroform, pyridine, and excess thionyl chloride were removed by distillation under reduced pressure at about 25° C., leaving a dark-colored residue. The residue was dissolved in 500 ml. of methylene chloride, and the soltuion was cooled to 15° C. and washed with three 200 ml. portions of ice-water. The three water washes were then extracted with methylene chloride, and the combined methylene chloride solutions were dried, filtered, and evaporated under reduced pressure, leaving a dark greenish-black oil weighing 5.5 g. This oil was dissolved in 5 ml. of methylene chloride. The solution was flowed through a Florisil column (1" by 16") and elution was carried out with 1500 ml. of petroleum ether. The eluate was collected and the solvent was removed by distillation, leaving a residual amber oil weighing 4.5 g. which was then dissolved in ethanol. The ethanol solution was poured through a 1" by 5" column of decolorizing carbon and diatomite (proportions, 1:2 by weight). Evaporation of the ethanol yielded 4 g. of diethyl p-[N,N-bis-(2 - chloroethyl)aminomethyl]benzylphosphonate as a colorless oil.

*Analysis.*—Calculated for $C_{16}H_{26}Cl_2NO_3P$: N, 3.66; Cl, 18.55; P, 8.10. Found: N, 3.57; Cl, 18.58; P, 7.84

*Part E.*—*Preparation of diethyl p-[N,N-bis-(2-chloroethyl)aminomethyl]benzylphosphonate hydrochloride.*—A quantity (3.82 g., 0.01 mole) of diethyl p-[N,N-bis-(2-chloroethyl)aminomethyl]benzylphosphonate is dissolved in 25 ml. of acetone and 0.83 ml. (0.01 mole) of 37 percent hydrochloric acid is added. After stirring fore one hour at about —20° C., evaporating the solvent, and drying, diethyl p-[N,N-bis-(2-chloroethyl)aminomethyl]benzylphosphonate hydrochloride is recovered.

Following the same procedure but substituting hydrobromic, sulfuric, nitric, phosphoric, tartaric, maleic, succinic, salicylic, acetic, and citric acids, the corresponding hydrobromide, sulfate, nitrate, phosphate, tartrate, maleate, succinate, salicylate, acetate, and citrate are prepared.

EXAMPLE 2

*Preparation of Diethyl o- and m-[N,N-Bis-(2-Chloroethyl)Aminomethyl]Benzylphosphonates*

Following the procedure of Example 1, Parts B, C, and D, respectively, but substituting diethyl o- and m-cyanobenzylphosphonate, respectively, for diethyl p-cyanobenzylphosphonate, the corresponding diethyl o-[N,N-bis-(2-chloroethyl)aminomethyl]benzylphosphonate and diethyl m - [N,N - bis - (2-chloroethyl)aminomethyl]benzylphosphonate are prepared.

EXAMPLE 3

*Preparation of Diethyl p-[N,N-Bis-(2-Bromoethyl) Aminomethyl]Benzylphosphonate*

Following the procedure of Example 1, Part D, but substituting pyridine hydrobromide for pyridine hydrochloride and thionyl bromide for thionyl chloride, diethyl p - [N,N - bis - (2-bromoethyl)aminomethyl]benzylphosphonate is obtained.

EXAMPLE 4

*Preparation of Dimethyl p-[N,N-Bis-(2-Chloroethyl) Aminomethyl]Benzylphosphonate*

Following the procedure of Example 1, Parts A, B, C, and D respectively, but substituting in Part A trimethyl phosphite for triethyl phosphite, dimethyl p-cyanobenzylphosphonate, dimethyl p-aminomethylbenzylphosphonate, dimethyl p-[N,N-bis-(2-hydroxyethyl)aminomethyl] benzylphosphonate, and dimethyl p-[N,N-bis-(2-chloroethyl) aminomethyl]benzylphosphonate are prepared.

EXAMPLE 5

*Preparation of Dibutyl p-[N,N-Bis-(2-Chloroethyl) Aminomethyl]Benzylphosphonate*

Following the procedure of Example 1, Parts A, B, C, and D, respectively, but substituting in Part A tributyl phosphite for triethyl phosphite, dibutyl p-cyanobenzylphosphonate, dibutyl p-aminomethylbenzylphosphonate, dibutyl p-[N,N-bis - (2-hydroxyethyl)aminomethyl]benzylphosphonate, and dibutyl p-[N,N-bis-(2-chloroethyl) aminomethyl]benzylphosphonate are prepared.

EXAMPLE 6

*Preparation of Disodium p-[N,N-Bis-(2-Chloroethyl) Aminomethyl]Benzylphosphonate*

*Part A.*—*Preparation of p-[N,N-bis(2-hydroxyethyl)aminoethyl]benzylphosphonic acid.*—A mixture of 34.5 g. (0.1 mole) of diethyl p-[N,N-bis-(2-hydroxyethyl)aminomethyl]benzylphosphonate, prepared as in Example 1, Part C, and 100 ml. of concentrated (37 percent) hydrochloric acid are heated on a steam bath for 4 hours. The reaction mixture is evaporated to dryness under reduced pressure, yielding p-[N,N-bis-(2-hydroxyethyl)aminomethyl]benzylphosphonic acid.

*Part B.*—*Preparation of p-[N,N-bis-(2-chloroethyl) aminomethyl]benzylphosphonic acid.*—Following the procedure of Example 1, Part D, but substituting p-[N,N-bis-(2-hydroxyethyl)aminomethyl]benzylphosphonic acid for diethyl p-[N,N-bis(2-hydroxyethyl)aminomethyl]-benzylphosphonate, p-[N,N - bis - (2-chloroethyl)aminomethyl]benzylphosphonic acid is prepared.

Part C.—Preparation of disodium p-[N,N-bis-(2-chloroethyl)aminomethyl]benzylphosphonate.—A portion (3.25 g., 0.01 mole) of p-[N,N-bis-(2-chloroethyl)aminomethyl]benzylphosphonic acid, prepared in Part B, is added to 30 ml. of dimethylformamide. To this mixture is added a solution containing 1.68 g. of sodium bicarbonate in 20 ml. water. The reaction mixture is stirred vigorously for 72 hours at 0° C. Upon evaporation of the solvents under vacuum, disodium p-[N,N-bis-(2-chloroethyl)aminomethyl]benzylphosphonate is obtained.

EXAMPLE 7

Preparation of Sodium Monoethyl p-[N,N-Bis-(2-Chloroethyl)Aminomethyl]Benzylphosphonate Part A.—Preparation of monoethyl p-[N,N-bis-(2-hydroxyethyl)aminomethyl]benzylphosphonate.—A mixture consisting of 3.45 g. (0.01 mole) of diethyl p-[N,N-bis - (2 - hydroxyethyl)aminomethyl]benzylphosphonate prepared as in Example 1, Part C, 2 g. of sodium hydroxide, and 10 ml. of water is heated on a steam bath for 8 hours. The reaction mixture is cooled in an ice bath while being adjusted to pH 6 with 1 N hydrochloric acid; and it is then extracted with chloroform. The aqueous solution is then concentrated at reduced pressure on a film evaporator, yielding monoethyl p-[N,N-bis-2-hydroxyethyl)amino]benzylphosphonate admixed with sodium chloride.

Part B.—Preparation of monoethyl p-[N,N-bis-(2-chloroethyl)aminomethyl]benzylphosphonate.—Following the procedure of Example 1, Part D, but substituting monoethyl p-[N,N-bis-(2-hydroxyethyl)aminomethyl]benzylphosphonate for diethyl p-[N,N-bis-(2-hydroxyethyl)aminomethyl]benzylphosphonate, monoethyl p-[N,N-bis-(2-chloroethyl)aminomethyl]benzylphosphonate is prepared.

Part C.—Preparation of sodium monoethyl p-[N,N-(2 - chloroethyl)aminomethyl]benzylphosphonate. — A quantity, 2.1 g. of monoethyl p-[N,N-bis-(2-chloroethyl)aminomethyl]benzylphosphonate, prepared in Part B, is added to 12 ml. of dimethylformamide, and to this is added a solution of 0.31 g. of sodium bicarbonate in 4 ml. of water. The reaction mixture is vigorously stirred for 72 hours at 0° C. The solvents are then removed under reduced pressure, yielding sodium monoethyl p-[N,N - bis - (2 - chloroethyl)aminomethyl]benzylphosphonate.

EXAMPLE 8

Preparation of Calcium p-[N,N-Bis-(2-Chloroethyl) Aminomethyl]Benzylphosphonate

A quantity (0.90 g.) of p-[N,N-bis-(2-chloroethyl)aminomethyl]benzylphosphonic acid prepared as in Example 6, Part B, is dissolved in 5 ml. of anhydrous ethanol to which is added 250 mg. of calcium carbonate. After standing for 24 hours the ethanol is evaporated on a steam bath, yielding calcium p-[N,N-bis-(2-chloroethyl)aminomethyl]benzylphosphonate.

We claim:

1. A compound selected from the group consisting of: (a) compounds having the following general structural formula

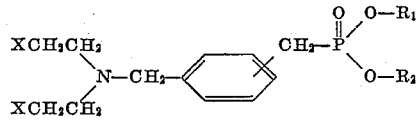

wherein X is halogen having an atomic weight between 35 and 127, and $R_1$ and $R_2$ are selected from the group consisting of hydrogen and lower-alkyl radicals, and (b) the salts thereof with pharmacologically acceptable acids and bases.

2. A compound of the following structural formula:

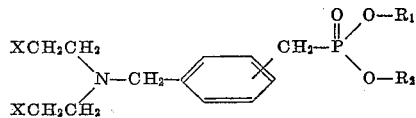

wherein X is halogen having an atomic weight between 35 and 127, and $R_1$ and $R_2$ are selected from the group consisting of hydrogen and lower-alkyl radicals.

3. Di-lower-alkyl N,N-bis-(2-haloethyl)aminomethylbenzylphosphonate according to claim 2.

4. Diethyl N,N-bis - (2-haloethyl)aminomethylbenzylphosphonate according to claim 2.

5. Pharmacologically acceptable acid addition salts of the compound of claim 2.

6. Diethyl p-[N,N - bis - (2-chloroethyl)aminomethyl] benzylphosphonate.

7. Di-lower-alkyl N,N - bis - (2 - hydroxyethyl)aminomethylbenzylphosphonate.

8. Diethyl p-[N,N-bis-(2 - hydroxyethyl)aminomethyl] benzylphosphonate.

9. Di-lower-alkyl aminomethylbenzylphosphonate.

10. Diethyl p-aminomethylbenzylphosphonate.

11. Di-lower-alkyl cyanobenzylphosphonate.

12. Diethyl p-cyanobenzylphosphonate.

13. Process for the preparation of a compound having the following general structural formula

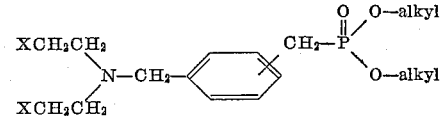

wherein X is halogen having an atomic weight between 35 and 127 which comprises reacting a cyanobenzyl halide with a trialkyl phosphite to produce a dialkyl cyanobenzylphosphonate, reducing the cyano group to aminomethyl, reacting the thus-obtained dialkyl aminomethylbenzylphosphonate with a 2-hydroxyethylating agent to produce a dialkyl N,N-bis-(2-hydroxyethyl)aminomethylbenzylphosphonate, and halogenating the N,N-bis-(2-hydroxyethyl) amino group to produce dialkyl N,N-bis-(2-haloethyl) aminomethylbenzylphosphonate.

14. Process for preparing a compound having the following general structural formula

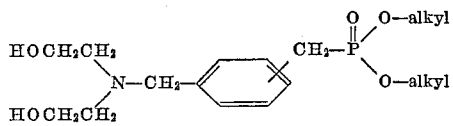

which comprises reacting a cyanobenzyl halide with a trialkyl phosphite to produce a dialkyl cyanobenzylphosphonate, reducing the cyano group to aminomethyl, and reacting the thus-obtained dialkyl aminomethylbenzylphosphonate with a 2-hydroxyethylating agent to produce a dialkyl N,N-bis-(2-hydroxyethyl)aminomethylbenzylphosphonate.

15. Process for preparing a compound having the following general structural formula

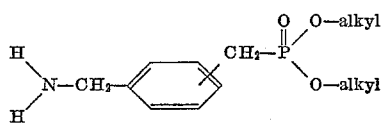

which comprises reacting a cyanobenzyl halide with a trialkyl phosphite to produce a dialkyl cyanobenzylphosphonate, and reducing the cyano group to aminomethyl to produce a dialkyl aminomethylbenzylphosphonate.

16. The process for the preparation of diethyl p-[N,N-bis - (2 - chloroethyl)aminomethyl]benzylphosphonate which comprises reacting p-cyanobenzyl bromide with triethyl phosphite to produce diethyl p-cyanobenzylphosphonate, reducing the cyano group to aminomethyl with hydrogen in the presence of platinum oxide catalyst, reacting the thus-obtained diethyl p-aminomethylbenzylphosphonate with ethylene oxide to produce diethyl p-[N,N-bis - (2 - hydroxyethyl)aminomethyl]benzylphosphonate, and reacting the thus-obtained compound with thionyl chloride to produce diethyl p-[N,N-bis-(2-chloroethyl)aminomethyl]benzylphosphonate.

17. The process for the preparation of diethyl p-[N,N-bis - (2 - hydroxyethyl)aminomethyl]benzylphosphonate which comprises reacting p-cyanobenzyl bromide with triethyl phosphite to produce diethyl p-cyanobenzylphosphonate, reducing the cyano group to aminomethyl with hydrogen in the presence of platinum oxide catalyst, and reacting the thus obtained diethyl p-aminomethylbenzylphosphonate with ethylene oxide to produce diethyl p[N,N - bis - (2 - hydroxyethyl)aminomethyl]benzylphosphonate.

18. The process for the preparation of diethyl p-aminomethylbenzylphosphonate which comprises reacting p-cyanobenzyl bromide with triethyl phosphite to produce diethyl p-cyanobenzylphosphonate, and reducing the cyano group to aminomethyl with hydrogen in the presence of platinum oxide catalyst.

19. Process for the preparation of a compound having the following structural formula:

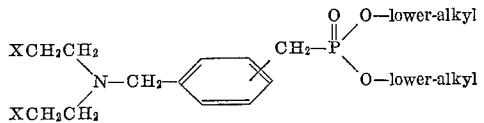

wherein X is halogen having an atomic weight between 35 and 127 which comprises reacting a cyanobenzyl halide with a tri-lower-alkyl phosphite to produce a di-lower-alkyl cyanobenzylphosphonate, reducing the cyano group to aminomethyl, reacting the thus-obtained di-lower-alkyl aminomethylbenzylphosphonate with a 2-hydroxyethylating agent to produce a di-lower-alkyl N,N-bis-(2-hydroxyethyl)aminomethylbenzylphosphonate, and halogenating the N,N-bis-(2-hydroxyethyl)amino group to produce di-lower-alkyl N,N - bis - (2 - haloethyl)aminomethylbenzylphosphonate.

References Cited in the file of this patent

UNITED STATES PATENTS

| 2,397,422 | Kosolapoff | Mar. 26, 1946 |
| 2,720,535 | Kosolapoff | Oct. 11, 1955 |
| 2,759,961 | Fitch | Aug. 21, 1956 |
| 2,882,314 | Weber | Apr. 14, 1959 |
| 2,917,533 | Burger | Dec. 15, 1959 |

OTHER REFERENCES

Wertheim: "Textbook of Organic Chemistry," the Blakiston Co., Philadelphia 1939, page 274.
Saunders et al.: "J. Chem. Soc." (1948) pp. 669–703.
Chemical Abstracts, vol. 45, 8444b (1951).
Chemical Abstracts, vol. 47, 2724i to 2725a (1953).
Chemical Abstracts, vol. 50, 9280d–h (1956).
Chemical Abstracts, vol. 51 1817–1818 (1957).